(12) United States Patent
Miller et al.

(10) Patent No.: US 10,296,955 B2
(45) Date of Patent: May 21, 2019

(54) ELECTRONIC SEARCH INTERFACE FOR IDENTIFYING ARTISAN SELLERS

(71) Applicant: Amazon Technologies, Inc., Seattle, WA (US)

(72) Inventors: Michael Hamilton Miller, Seattle, WA (US); Caroline Tracey Burns, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 785 days.

(21) Appl. No.: 14/703,318

(22) Filed: May 4, 2015

(65) Prior Publication Data

US 2016/0328769 A1    Nov. 10, 2016

(51) Int. Cl.
  *G06Q 30/06* (2012.01)
  *H04L 29/06* (2006.01)

(52) U.S. Cl.
  CPC ..... *G06Q 30/0621* (2013.01); *G06Q 30/0625* (2013.01); *G06Q 30/0643* (2013.01); *H04L 65/1069* (2013.01)

(58) Field of Classification Search
  CPC .............. G06Q 30/00–30/08; H04L 65/1069
  See application file for complete search history.

(56) References Cited

U.S. PATENT DOCUMENTS 8,515,830 B1     8/2013  Arora et al.
2005/0144052 A1*  6/2005  Harding ............ G06F 17/30873
                                                             705/26.1
2008/0010276 A1*  1/2008  Morton ............. G06F 17/30675

OTHER PUBLICATIONS

International Search Report for PCT/US2016/029347 dated Jun. 29, 2016.
Tissue paper sheets on Etsy, a global handmade and vintage marketplace, https://www.etsy.com/search?q=tissue paper sheets, retrieved from the internet on May 4, 2015, pp. 1-4.

* cited by examiner

*Primary Examiner* — Michael Misiaszek
(74) *Attorney, Agent, or Firm* — Thomas | Horstemeyer, LLP

(57) ABSTRACT

Disclosed are various embodiments for an electronic search interface to identify artisan sellers. A search query is received from a client. An electronic item database is then searched to identify items that are relevant to the search query. Two or more items may be offered by each of multiple sellers. A search result listing is generated that includes one item offered by each seller with a greatest display prominence. Other items offered by the sellers may be excluded or displayed with a lesser prominence.

20 Claims, 7 Drawing Sheets

200

ELECTRONIC SEARCH INTERFACE FOR IDENTIFYING ARTISAN SELLERS

BACKGROUND

Electronic marketplaces may feature a multitude of different sellers. The sellers may offer a variety of different products. In some cases, multiple sellers may offer an identical product. Such sellers may compete based upon price, delivery options, reputation, and other factors.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing an electronic search interface for identifying artisan sellers in an electronic marketplace. Many sellers may purchase products in bulk quantities from manufacturers or distributors and then resell the products to the general public. Such products may be mass produced, perhaps through the use of automated processes and machines. By contrast, artisan sellers may individually craft each product. Such products may include, for example, jewelry, clothing, home decor, pottery, stationery, party favors, and others. In some cases, artisan sellers may take orders for custom products that are individually tailored for specific customers.

Typical electronic search interfaces may commingle products offered by regular sellers and artisan sellers. When a user enters a search query, a product database may be searched and all relevant results displayed. Unfortunately for artisan sellers, they may sell individual products in relatively low volumes, and relevancy formulas may rank their product listings near the bottom of the search results. Fungible products that are offered by many sellers may have much higher collective sales volumes, thereby resulting in high rankings in the search results. Also, when a user is searching for an individually crafted product, the user may be more interested in learning about the artisan seller in general as opposed to the information in a single product listing.

Various embodiments of the present disclosure facilitate an artisan seller search within an electronic product database. In one embodiment, when searching for artisan products, the product search results include products from different sellers, and the product search results from each respective seller may be grouped together, or deduplicated, such that a limited number of search results for the most relevant products from the respective seller are included within the search results. For example, this may correspond to a single search result for each artisan seller. In another embodiment, a user may specify location refinements in order to limit the scope of a product search to only those sellers in a particular geographic area or meeting other location criteria. In other embodiments, a user may search an electronic product database based at least in part on a time to manufacture, a seller's willingness to accept custom orders, seller certifications, and other seller-focused search criteria. Although the embodiments herein are discussed with reference to artisan sellers, it is understood that the concepts herein may be applicable to other types of sellers as well.

Figure 1A:
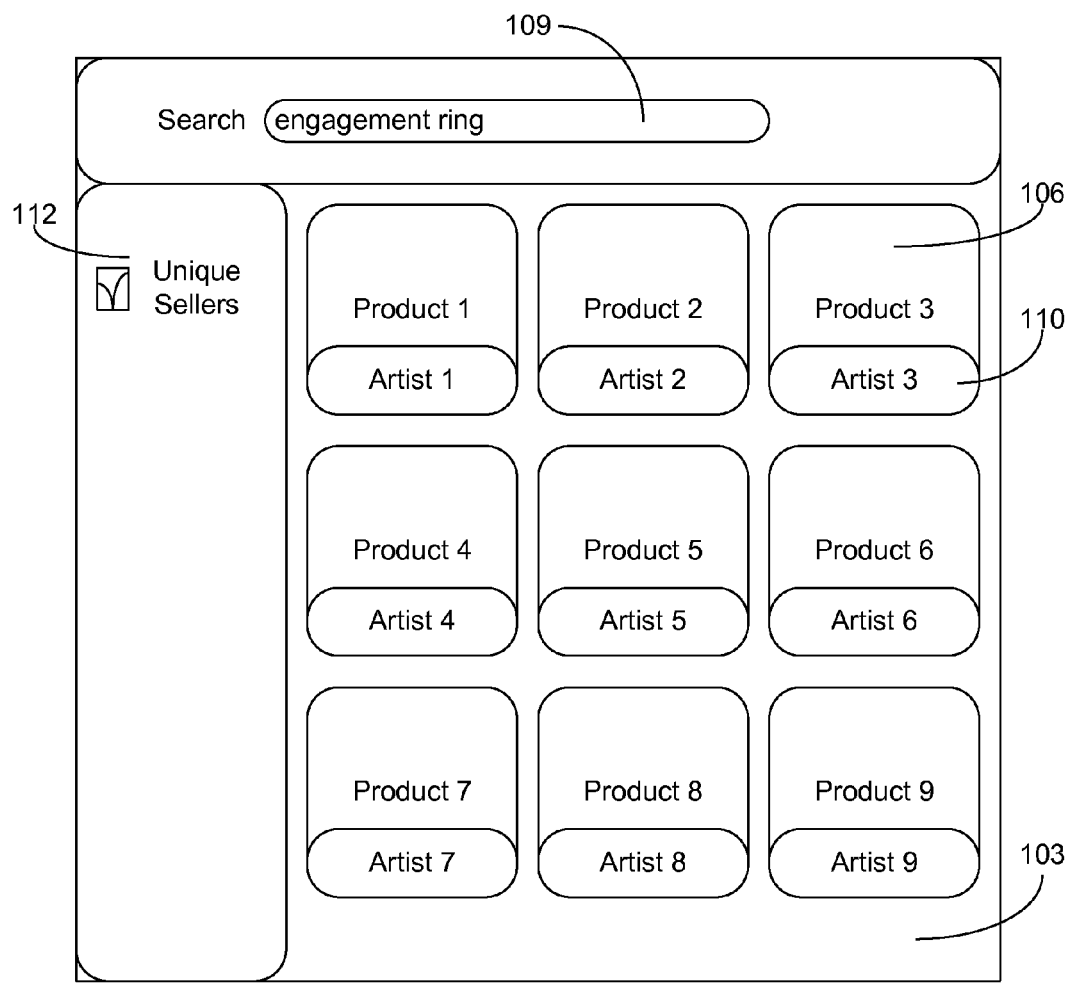
FIGS. 1A and 1B are pictorial diagrams of examples of user interfaces according to embodiments of the present disclosure.

Turning now to FIG. 1A, shown is one example of a user interface 100 according to an embodiment of the present disclosure. The user interface 100 presents a search result listing 103 that includes a plurality of product search results 106. A search query 109 is received from a user (i.e., "engagement ring"), and an electronic product database is searched to determine products that match the search query 109. In the context of FIG. 1A, the search that is performed is of products offered by artisan sellers. In an electronic marketplace that also features conventional sellers, a specific category may be designated by a user (e.g., handmade jewelry, crafts, etc.) so as to focus the search to products offered by artisan sellers.

Each of the search results 106 may feature an image, title, price, and/or other information about a specific product offered in the electronic product database. Moreover, seller information 110 may be surfaced in conjunction with each search result 106. The seller information 110 may include a seller name, logo, image, and/or other information about the seller. Selecting a link, image, and/or other component relative to the search result 106 may cause additional information about a product (e.g., a product detail page) to be rendered. Also, selecting a link, image, and/or other component relative to the seller information 110 may cause additional information about the seller (e.g., a seller detail page) to be rendered.

In this example, the user has selected an item grouping criterion 112, and more specifically, the user has checked a checkbox labeled "Unique Sellers." Selection of the item grouping criterion 112 causes only a single product from each individual seller to be included within the search result listing 103. This product may be, for example, the most relevant product that the particular seller offers. Alternatively, this product may be selected based at least in part on seller designated criteria. For example, a seller may have certain product designs for which they are best known, and the seller may specify that those designs should be preferred for presentation in search results. In other embodiments, the item grouping criterion 112 may be enabled by default or may otherwise constitute default behavior in generating the search results 106 in the search result listing 103. By showing only a single product for each artisan seller, the search result listing 103 may be condensed. Also, artisan sellers would not be able to manipulate the results by having numerous different product listings. This enables the electronic marketplace to present not only relevant product results, but also results from a diverse set of sellers. Thus, a customer can shop artisans as well as products.

When a user would like to have a product custom made, the focus may be on identifying a particular seller rather than identifying a stock product offered by the seller. That is to say, the capabilities of the artisan seller may be evaluated by the search user, rather than the user merely selecting a particular product. Thus, the most relevant product of a given artisan seller may be a worthy example of the artisan seller's capability in lieu of an exhaustive list of repertoire examples. Additional examples of search refinements and seller qualification criteria will be discussed below with respect to the operation of the system and its components.

Figure 1B:
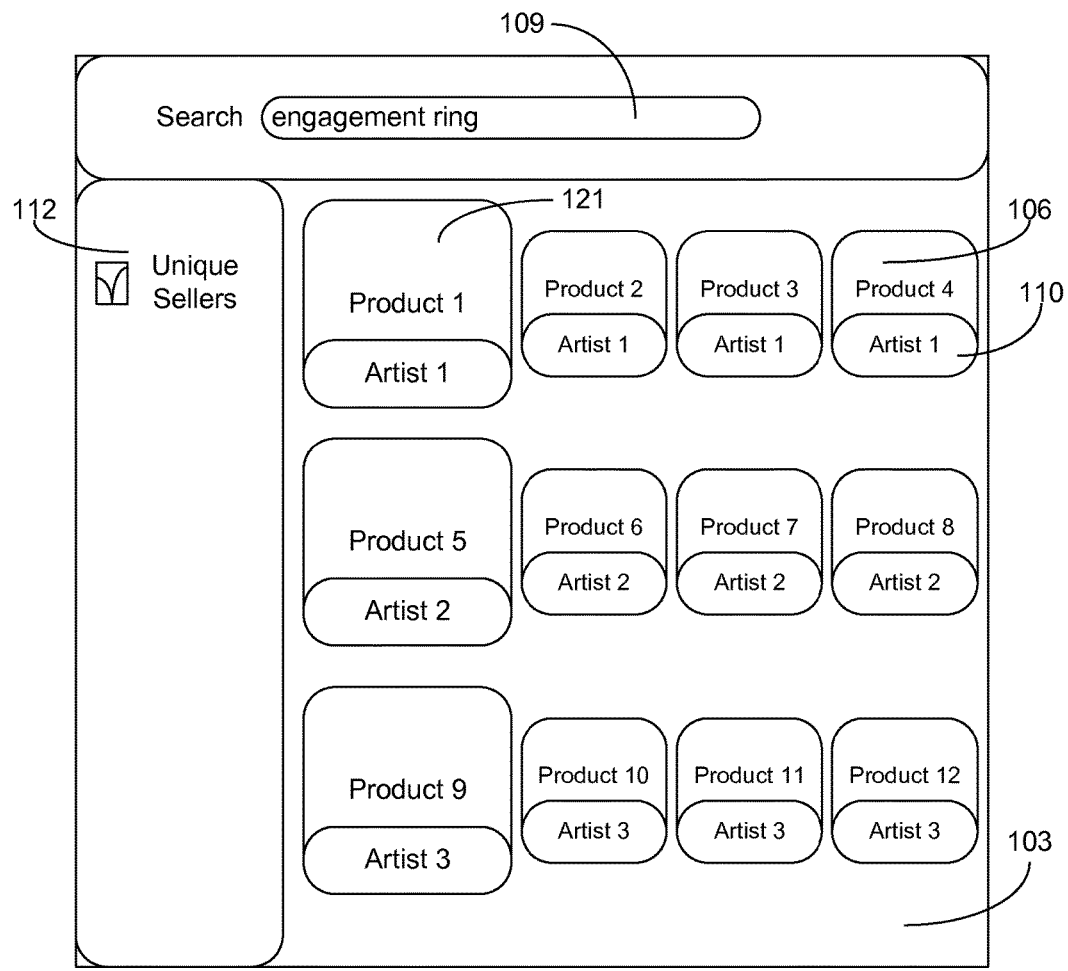

Moving now to FIG. 1B, shown is one example of a user interface 120 according to an embodiment of the present disclosure. Unlike the user interface 100 of FIG. 1A, the user interface 120 includes multiple search results 106 for each seller. However, the multiple search results 106 are grouped in response to the selection of the item grouping criterion 112. Additionally, a single search result 121 for each seller is given a greater prominence than the other search results 106 for that seller. For example, the single search result 121 may be given a greater display area than the other search results 106 of the seller. The single search result 121 may, for example, be the most relevant result of the seller's search results 106.

A limited amount of screen space may be provided for the search results 106 of each seller. In the example of FIG. 1B, a maximum of four results may be shown for each seller, though other quantity limits may be employed. If additional results are available, the user interface 120 may facilitate scrolling horizontally to access the additional results of the seller. In yet another example, a single search result 121 may be shown, but with a visual indication of a quantity of additional search results 106 that may be accessed by selecting a link or other user interface component.

Figure 2:
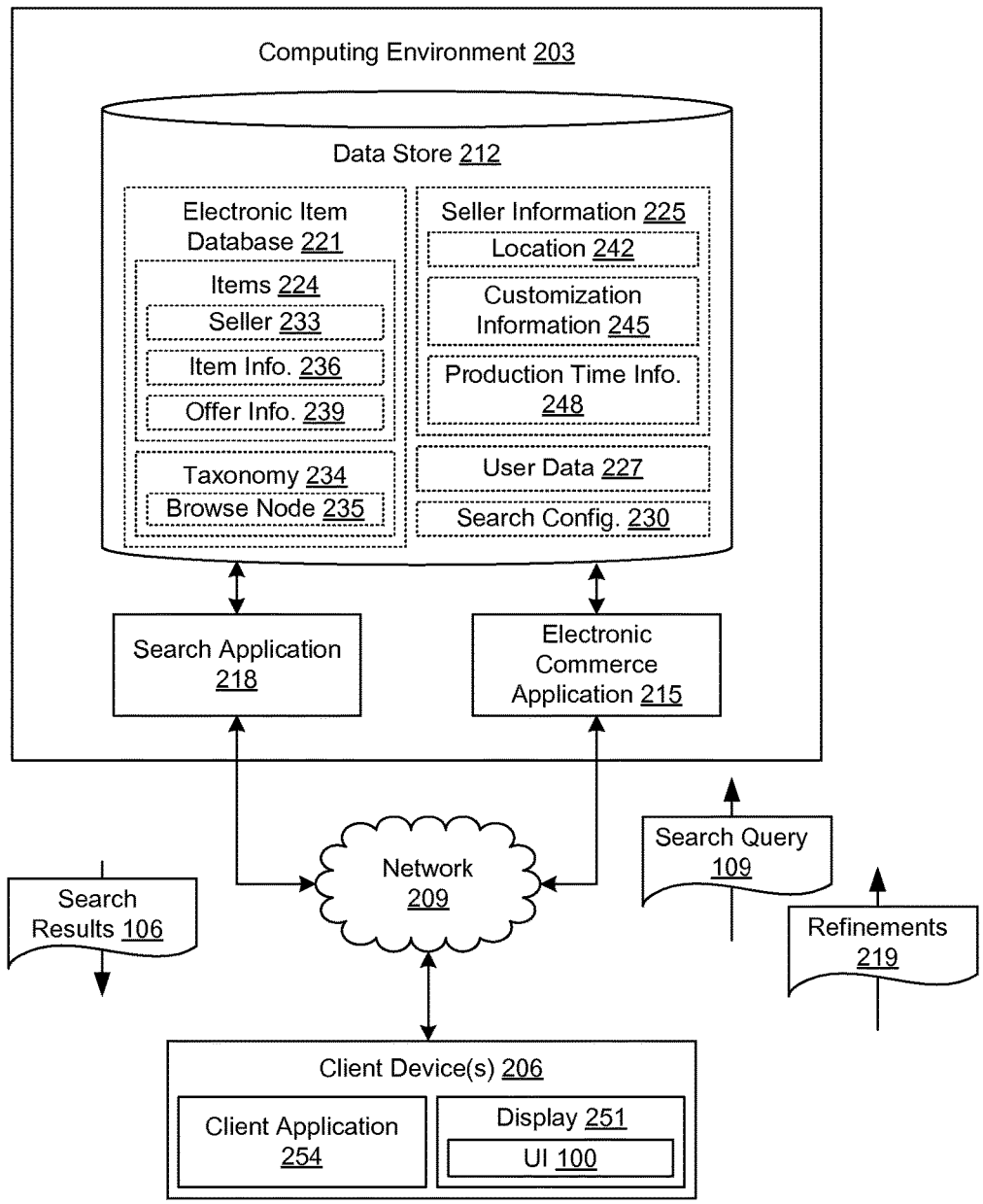
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks, computer banks, or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an electronic commerce application 215, a search application 218, and other applications, services, processes, systems, engines, or functionality not discussed in detail herein. The electronic commerce application 215 is executed in order to facilitate the online purchase of items over the network 209. The electronic commerce application 215 also performs various backend functions associated with an electronic marketplace in order to facilitate the online purchase of items as will be described. For example, the electronic commerce application 215 may generate network pages such as web pages or other types of network content that are provided to client devices 206 for the purposes of selecting items for purchase, rental, download, lease, or other form of consumption as will be described. In one embodiment, the electronic commerce application 215 is configured to facilitate an online customization conference between a seller and a customer over the network 209 to discuss designing a customized item. Such a customization conference may include video and/or audio.

The search application 218 is executed to generate search results 106 in response to receiving a search query 109 and possibly refinements 219 from a client device 206 over the network 209. To this end, the search application 218 is configured to search an electronic item database 221 for items 224 that are associated with data that matches the search query 109. The search application 218 may also apply one or more refinements 219 received from the client device 206 or stored in connection with a user profile in order to filter or limit the search results 106. The generated search results 106 may be included within a search result listing 103 that is returned to the client device 206 for rendering in a user interface 100 (FIG. 1A).

The data stored in the data store 212 includes, for example, an electronic item database 221, seller information 225, user data 227, a search configuration 230, and potentially other data. The electronic item database 221 includes information about a plurality of items 224 offered by a plurality of sellers 233 in an electronic marketplace. As used herein, the term "item" may refer to products, goods, services, downloads, and/or any other item that may be offered for sale, lease, rental, or other forms of consumption.

In some cases, the items 224 may be organized within the electronic item database 221 into a taxonomy 234 of categories to facilitate browsing, which may be represented, for example, by a tree structure composed of browse nodes 235. As a non-limiting example, a browse node 235 may correspond to "Crafts" with multiple child browse nodes 235 such as "Jewelry" and "Home Decor." An item 224 may be associated with one or more such browse nodes 235. Some browse nodes 235 may include items 224 that are associated only with artisan sellers 233, while other browse nodes 235 may include items 224 that are associated with artisan sellers 233 and non-artisan sellers 233, while still other browse nodes 235 may include items 224 associated only with non-artisan sellers 233.

Each item 224 may be associated with a given seller 233, item information 236, offer information 239, and/or other data. In some cases, an item 224 may be offered by multiple sellers 233 in an electronic marketplace. However, especially with artisan sellers 233, a given item 224 may be unique to the particular seller 233 and may be assigned a unique item identifier.

The item information 236 may include title, description, weight, images, shipping classifications, customer reviews, videos, and/or other information that may be used to describe an item 224. The offer information 239 may include information relating to a specific offering of the item 224 by a seller 233 in an electronic marketplace. To this end, the offer information 239 may include price, availability, discounts, and/or other information.

The seller information 225 includes information about a given seller 233 that participates in the electronic marketplace. The seller information 225 may be shared among some or all of multiple items 224 offered by a seller 233. The seller information 225 may include, for example, a location 242, customization information 245, production time information 248, seller certification information, and/or other data. The location 242 may be the seller's place of business, fulfillment location, and/or other locations. In some cases, a seller 233 may be associated with multiple locations 242.

The customization information 245 may indicate whether a seller 233 is willing to produce a customized item 224, and if so, what attributes of the item 224 are available for customization. For some types of items 224, the customization information 245 may specify that certain attributes are required to be specified by a user in order to produce the item 224. For example, a seller 233 may indicate in the customization information 245 that for an item 224 that is a decorative name tag, a user may be required to provide the name that is to be shown upon the decorative name tag. The customization information 245 may also indicate the willingness of the seller 233 to participate in a design customization conference with the customer, which may include video and/or audio and may be facilitated by way of the electronic commerce application 215. The design customization conference may also include an in-person appointment, which may be especially appropriate when a local seller is selected. For instance, customers ordering made-to-measure clothes may want to schedule an in-person appointment to have their measurements taken, rather than supplying the measurements to the seller remotely. Seller availability for in-person appointments may also be specified in the customization information 245. In some cases, an in-person appointment may result in an increased cost to the customer.

The production time information 248 may include information relating to how long it will take to manufacture or produce items 224. For example, an artisan seller 233 of handcrafted custom jewelry may specify a production time of six weeks. In some cases, the production time information 248 may specify approximate times until shipping, shipping times, and/or other durations that may impact how long it will take a customer to receive an item 224.

The user data 227 may include various data about users of the electronic marketplace, including profile information, personalization information, demographic information, browsing history, order history, previous purchasing habits, and so on. The previous purchasing habits and other user data 227 may, for example, be used to direct users to particular sellers 233 (e.g., "Sellers you may be interested in"). The search configuration 230 may include parameters that control the operation of the search application 218. For example, the search configuration 230 may indicate how many search results 106 should be shown within a single network page, relevancy formulas for selecting and/or ranking search results 106, whether items 224 from sellers 233 should be grouped, etc.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may include a display 251. The display 251 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 254 and/or other applications. The client application 254 may be executed in a client device 206, for example, to access network content served up by the computing environment 203 and/or other servers, thereby rendering a user interface 100 on the display 251. To this end, the client application 254 may comprise, for example, a browser, a dedicated application, etc., and the user interface 100 may comprise a network page, an application screen, etc. The client device 206 may be configured to execute applications beyond the client application 254 such as, for example, email applications, social networking applications, word processors, spreadsheets, and/or other applications.

Next, a general description of the operation of the various components of the networked environment 200 is provided. To begin, a user at a client device 206 may request a network page from the electronic commerce application 215 or the search application 218 that includes a component that facilitates specification of a search query 109. For example, the component may correspond to a text input field. Alternatively, the user may select a browse node 235 within a taxonomy 234 and this may correspond to a search query 109 directed at all items 224 associated with the selected browse node 235.

In addition, the network page may include one or more components that permit refinements 219 to be specified. For example, a user may enable an item grouping criterion such that only a single item 224 from each seller 233 is returned. In addition, the user may also specify seller qualification criteria that may be used to filter the results by qualified sellers 233. For example, the seller qualification criteria may be based at least in part on location 242, a production time, whether the seller 233 is willing to customize the item 224, whether the seller 233 supports a particular type of customization, whether the seller 233 is willing to participate in a design customization conference, ratings of the seller 233, seller certifications, seller skills, technologies or tools used by the seller 233, materials used by the seller 233, aesthetics, associations of the seller 233 (e.g., fair trade, sources of material, employment methodologies, organizations), and/or other qualification criteria. The network page may include checkboxes, sliders, drop-down boxes, text input fields, text areas, and/or other input components in order to specify the refinements 219.

Upon receiving the search query 109 and refinements 219, the search application 218 performs a search of the electronic item database 221 for items 224 that match, or are relevant to, the search query 109. In this regard, the search application 218 may compare the text of the search query 109 to text in the title, description, customer reviews, etc. in the item information 236. If there is a match, or at least a partial match, the item 224 is considered for inclusion in the search results 106. Synonyms, spelling correction, and related words may be used to facilitate the matching process. For example, if a user searches for "flatware," the term "cutlery" may also be used in the search.

Each item 224 returned from the search may be associated with a respective measure of relevancy. The measure of relevancy may be based on a variety of factors, including, for example, quality of the textual match to the search query 106, listing date of the item 224, popularity of the item 224, price of the item 224, customer rating of the item 224, and/or other relevancy factors. A linear combination wherein each factor is weighted by a respective constant and the weighted factors are summed may be used to compute the relevancy measures. The items 224 within the search results 106 may be ranked according to the respective relevancy measures.

The resulting items 224 that otherwise match the search query 109 may then be filtered by the search application 218 according to the refinements 219. For example, the refinements 219 may specify seller qualification criteria, and the seller information 225 for a given item 224 may be compared with the seller qualification criteria to determine whether the corresponding seller 233 meets the criteria. If the seller 233 does not meet the criteria, the items 224 of the seller 233 may be excluded from the search results 106. Alternatively, the items 224 of the seller 233 may be assigned a lower ranking or relevancy score.

Further, if an item grouping criterion 112 (FIG. 1A) is enabled, the resulting items 224 may be filtered so that only a single item 224 from each respective seller 223 is included within the search results 106 of the search result listing 103. In one embodiment, only the item 224 that is most relevant will be shown, while the other, lesser relevant items 224 of the seller 233 are excluded from the search results 106. In another embodiment, the results from each seller 233 are displayed as a stack of results (e.g., cascading thumbnails) so that the customer can see that there are multiple results from that seller 233. The most relevant result may be the only one displayed for that seller 233, or the most relevant result may be emphasized or given a greater prominence as compared to the lesser relevant results. Some visual cue may be presented that evidences that multiple items 224 from the seller 233 are available, and the visual cue may be selected to take the customer to the seller's detail page.

The search application 218 then generates a search result listing 103 including the filtered search results 106. The search result listing 103 may be encoded in a network page or other user interface and then returned to the client device 206 over the network 209. Where the number of search results 106 is too great to be rendered upon a display 251, the search results 106 may be divided among multiple network pages, or a viewport of the user interface 100 may expand (e.g., upon scrolling) such that additional search results 106 may be viewed.

In some embodiments, the client application 254 may perform the filtering of the search results 106 described herein. For example, data describing all items 224 matching the search query 109 may be returned to the client application 254. The client application 254 may be configured to assess applicability of refinements 219, including seller qualification criteria and an item grouping criterion, to determine which items 224 are to be excluded from the search result listing 103. This may occur dynamically after an initial search result listing 103 is rendered upon the display 251.

A search result 106 rendered in a search result listing 103 may include a link or other component to obtain additional information about the item 224 (i.e., an item detail page) as well as a link or other component to obtain additional information about the seller 233 (i.e., a seller detail page). An item detail page may include full descriptions, additional images, customer reviews, etc., regarding a given item 224, as well as components that facilitate adding the item 224 to a shopping cart or other type of list and/or completing an order of the item 224.

Where search results 106 from non-artisan sellers 233 are mixed with search results 106 from artisan sellers 233, the search application 218 may be configured to replace item search results 106 from the artisan sellers 233 with a single widget for the artisan seller 233 that directs the user to a seller detail page. These widgets may be commingled with item search results 106 from the non-artisan sellers 233.

Figure 3A:
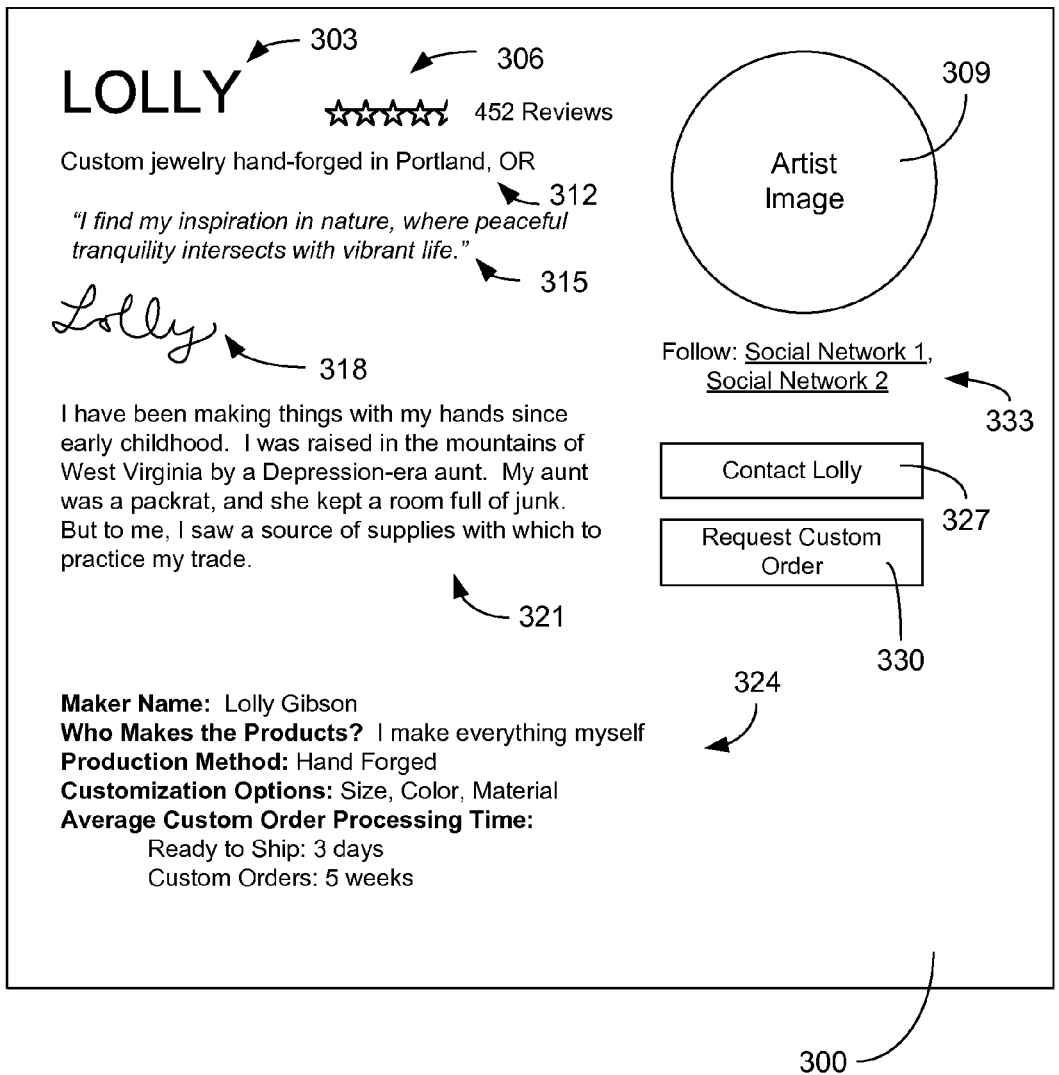
FIGS. 3A and 3B are pictorial diagrams of example user interfaces rendered by a client device in the networked environment of FIG. 2 according to various embodiments of the present disclosure.
Figure 3B:
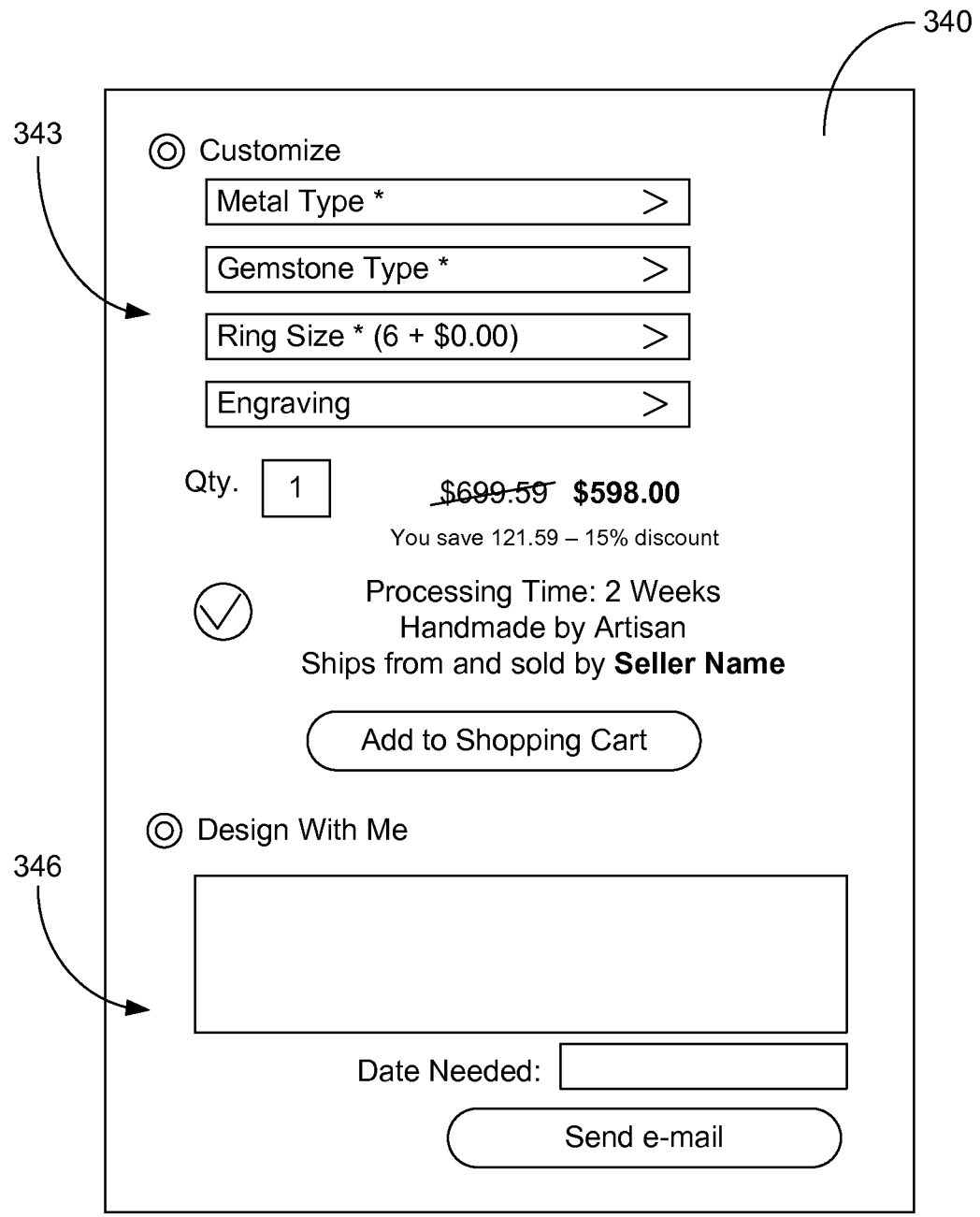

Referring next to FIG. 3A, shown is one example of a seller detail page 300 generated by an electronic commerce application 215 (FIG. 2) executed in a computing environment 203 (FIG. 2) of the networked environment 200 (FIG. 2). The seller detail page 300 is used to provide additional information about an artisan seller 233 (FIG. 2) to prospective customers. This information may include design, manufacturing practices, history, and so on. The seller detail page 300 allows customers to determine the level of skill and craftsmanship involved in the production of the seller's items 224 (FIG. 2). The seller detail page 300 may be a place for the seller 233 to add rich media to communicate their story.

In this example, the seller name 303 is prominently displayed, near seller rating information 306 of the seller 233. One or more images 309 of the seller 233 may be displayed. The seller detail page 300 may include a tagline 312 and a quotation 315. In some cases, a signature 318 of the seller 233 may be shown. Biographical information 321 may be presented, along with other information 324 including artisan name, who manufactures the items 224 (FIG. 2), production method, customization options, average custom order processing time, and so on. A component 327 may be provided to contact the seller 233, and a component 330 may be provided to request a custom order. Various links 333 may be provided to view the presence of the seller 233 on social networks.

In other examples, various items 224 may be featured or showcased upon the seller detail page 300. The seller detail page 300 may also include videos, an icon indicating what region or geographic area in which the seller 233 is located, and other information. In addition to displaying content provided by the seller 233, content provided by the electronic marketplace may also be included on the seller detail page 300. For example, customer item reviews, item ratings, etc., may be included. This marketplace content may be non-specific to the particular seller 233.

Figure 4:
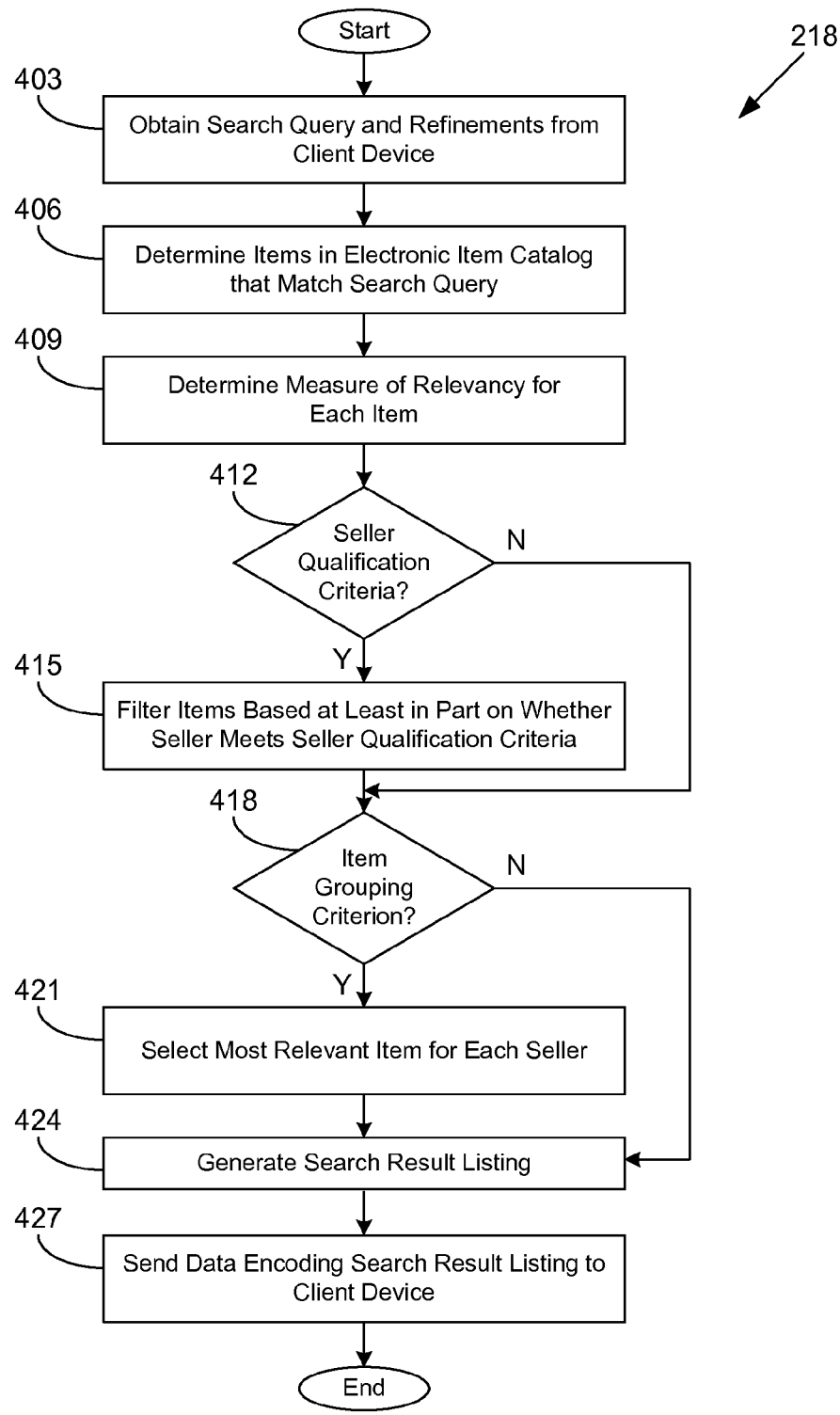
FIG. 4 is a flowchart illustrating one example of functionality implemented as portions of a search application executed in a computing environment in the networked environment of FIG. 2 according to various embodiments of the present disclosure.

Turning now to FIG. 4, shown is one example of a user interface 340 rendered in association with a product detail page generated by the electronic commerce application 215 (FIG. 2) executed in a computing environment 203 (FIG. 2) of the networked environment 200 (FIG. 2). The user interface 340 pertains to specifying customization options for a particular artisan item 224 (FIG. 2). The user interface 340 includes two alternative approaches to specifying customization options: components 343 allow for selecting from a predetermined set of customization options, while components 346 allow for direct communication with the seller 233 (FIG. 2). In this example, radio buttons are used to select either the components 343 or the components 346.

The components 343 allow a user to select from a variety of customization options. This non-limiting example pertains to a ring, and allows for selection of options relating to metal type, gemstone type, ring size, engraving, and quantity. Some options are required to be specified, while others are not required. Some options may involve an upcharge or downcharge with respect to an initially quoted price. The components 343 include a price quote, an estimate of processing time, and a component configured to add the customized artisan item 224 to a shopping cart or to place an order.

By contrast, the components 346 allow a user to enter freeform text describing the desired customizations for the item 224, which is shared with the seller 233 for consideration. However, the seller 233 may have agreed to participate in such a program, thereby allowing the seller 233 to be found via the search application 218 (FIG. 2) when participation is required as a seller qualification by a user. In addition to freeform text input, the components 346 may facilitate an audio or video design conference in other examples. Upon entry of the design specification and a date at which the item 224 is needed, an email or other form of communication may be sent to the seller 233 and the seller may be able to accept or reject the order. In some embodiments, the user may be able to provide inspirational information to the seller 233. For example, the user may upload an image of an item 224 and ask the seller 233 to make a similar item 224.

Referring next to FIG. 4, shown is a flowchart that provides one example of the operation of a portion of the search application 218 according to various embodiments. It is understood that the flowchart of FIG. 4 provides merely an example of the many different types of functional arrangements that may be employed to implement the operation of the portion of the search application 218 as described herein. As an alternative, the flowchart of FIG. 4 may be viewed as depicting an example of elements of a method implemented in the computing environment 203 (FIG. 2) according to one or more embodiments.

Beginning with box 403, the search application 218 obtains a search query 109 (FIG. 2) and potentially one or more refinements 219 (FIG. 2) from a client device 206 (FIG. 2) by way of a network 209 (FIG. 2). In box 406, the search application 218 determines items 224 (FIG. 2) from the electronic item database 221 (FIG. 2) that match the search query 109. In box 409, the search application 218 determines a measure of relevancy for each item 224. For example, the relevancy may be based at least in part on a listing date, an item price, a quantity of views, a seller rating, and/or other factors.

In box 412, the search application 218 determines whether seller qualification criteria are specified by the refinements 219. If so, the search application 218 moves to box 415 and filters the items 224 based at least in part on whether the seller 233 (FIG. 2) of the respective item 224 meets the specified seller qualification criteria. For example, seller qualification criteria may require that the seller 223 offer a customization video conference via a customization conference participation criterion, offer a specific type of product customization, be willing to produce a customized item, meet seller location criteria, meet production time criteria, meet seller certification criteria, and so on. The search application 218 then continues to box 418. If no seller qualification criteria are specified, the search application 218 moves from box 412 to box 418.

In box 418, the search application 218 determines whether an item grouping criterion 112 (FIG. 2) is specified by the refinements 219. If the item grouping criterion 112 is specified, the search application 218 moves to box 421 and selects a single most relevant item 224 for each seller 233. In this regard, the search application 219 may exclude all items 224 offered by each seller 233 other than the single item 224 from the search results. Alternatively, the other items 224 may be featured with a lesser display prominence (i.e., with smaller text, images, and display size) as compared to the selected single items 224. The search application 218 then continues to box 424. If the item grouping criterion is not specified, the search application 218 continues directly from box 418 to box 424.

In box 424, the search application 218 generates a search result listing 103 (FIG. 1A) including a plurality of search results 106 (FIG. 2). In box 427, the search application 218 sends data encoding the search result listing 103 to the client device 206 over the network 209. Thereafter, the portion of the search application 218 ends.

Figure 5:
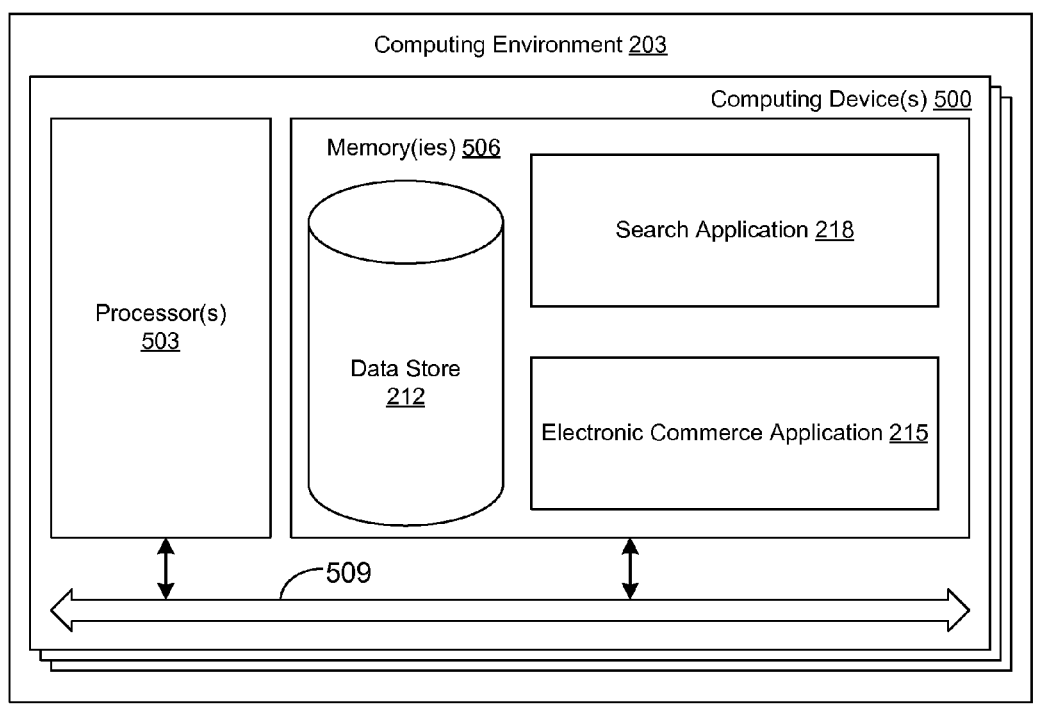
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the electronic commerce application 215, the search application 218, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce application 215, the search application 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the search application 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 215 and the search application 218, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce application 215 and the search application 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
receive a search query and a seller qualification criterion from a client;
determine a plurality of products from an electronic product database that match the search query, the plurality of products being offered by a plurality of artisan sellers;
filter individual ones of the plurality of products based at least in part on whether a corresponding one of the plurality of artisan sellers meets the seller qualification criterion;
determine that the plurality of artisan sellers each offer at least two of the filtered ones of the plurality of products;
select a single product for individual ones of the plurality of artisan sellers, the single product being a most relevant product offered by the individual ones of the plurality of artisan sellers;
generate a search result listing presenting filtered ones of the plurality of products, wherein the selected single products are given a greatest display prominence in the search result listing, and the search result listing includes at least one component to cause the non-selected filtered ones of the plurality of products offered by a corresponding seller of the plurality of sellers to be presented in the search result listing; and
send data encoding the search result listing to the client.

2. The non-transitory computer-readable medium of claim 1, wherein the seller qualification criterion requires that the corresponding one of the plurality of sellers offer a specified type of product customization.

3. The non-transitory computer-readable medium of claim 1, wherein the seller qualification criterion requires that the corresponding one of the plurality of sellers offer a customization video conference.

4. A method, comprising:
receiving, via at least one computing device, a search query and a seller qualification criterion from a client;
determining, via the at least one computing device, a plurality of items from an electronic item database that match the search query;
filtering, via the at least one computing device, individual ones of the plurality of items based at least in part on whether a corresponding one of a plurality of sellers meets the seller qualification criterion;
determining, via the at least one computing device, that the plurality of sellers each offer at least two of the filtered ones of the plurality of items;
selecting, via the at least one computing device, a single prominently featured item for each of the plurality of sellers from the filtered ones of the plurality of items;
generating, via the at least one computing device, a search result listing presenting the single prominently featured item for each of the plurality of sellers, wherein the search result listing includes a component to cause the non-selected filtered ones of the plurality of items offered by the corresponding one of the plurality of sellers to be presented in the search result listing; and
sending, via the at least one computing device, the search result listing to the client.

5. The method of claim 4, wherein a search result in the search result listing includes a first component that when selected causes additional information about a respective one of the plurality of items to be rendered and a second component that when selected causes additional information about the corresponding seller to be rendered.

6. The method of claim 4, further comprising, prior to a selection of the component, excluding, via the at least one computing device, the filtered ones of the plurality of items from the corresponding one of the plurality of sellers from the search result listing other than the single prominently featured item for the corresponding one of the plurality of sellers.

7. The method of claim 6, wherein the excluding is performed in response to receiving an item grouping criterion from the client.

8. The method of claim 4, wherein the seller qualification criterion qualifies the corresponding one of a plurality of sellers based at least in part on whether the corresponding one of a plurality of sellers is willing to participate in a customization video conference with a customer.

9. The method of claim 4, wherein the seller qualification criterion qualifies the corresponding one of a plurality of sellers based at least in part on whether the corresponding one of a plurality of sellers is willing to produce a customized item.

10. The method of claim 4, further comprising ranking, via the at least one computing device, the individual ones of the plurality of items based at least in part on a respective measure of relevancy.

11. The method of claim 10, wherein the respective measure of relevancy is based at least in part on at least one of: a listing date, an item price, a quantity of views, or a seller rating.

12. A system, comprising:
at least one computing device; and
at least one application executable in the at least one computing device, wherein when executed the at least one application causes the at least one computing device to at least:
receive a search query, an item grouping criterion, and a seller qualification criterion from a client;
determine a plurality of items from an electronic item database that match the search query;
filter individual ones of the plurality of items based at least in part on whether a corresponding one of a plurality of sellers meets the seller qualification criterion;
determine that the plurality of sellers each offer at least two of the filtered ones of the plurality of items;
in response to the item grouping criterion, select a single item respectively offered by each of the plurality of sellers;
generate a search result listing presenting filtered ones of the plurality of items, wherein the search result listing that is generated further includes the single item prominently featured for each of the plurality of sellers; and send the search result listing to the client.

13. The system of claim 12, wherein the search result listing further includes a component to cause at least one additional item respectively offered by at least one of the plurality of sellers to be presented, the at least one additional item having a lesser display area than the single item of the at least one of the plurality of sellers.

14. The system of claim 12, wherein sending the search result listing to the client further comprises sending data encoding a user interface configured to present the search result listing to the client, and wherein the user interface includes a component associated with the single item that, when selected, causes information about a corresponding one of the plurality of sellers to be rendered for display by the client.

15. The system of claim 12, wherein when executed the at least one application further causes the at least one computing device to at least determine the single item from the at least two of the plurality of items as having a highest measure of relevance to the search query.

16. The system of claim 12, wherein the seller qualification criterion comprises a seller location criterion received from the client.

17. The system of claim 12, wherein the seller qualification criterion comprises a production time criterion received from the client.

18. The system of claim 12, wherein the seller qualification criterion comprises a seller certification criterion received from the client.

19. The system of claim 12, wherein the seller qualification criterion comprises a customization conference participation criterion received from the client.

20. The method of claim 4, wherein the component corresponds to a scrolling component or a link component.

* * * * *